US006084009A

United States Patent [19]
Mizoguchi et al.

[11] Patent Number: 6,084,009
[45] Date of Patent: *Jul. 4, 2000

[54] POWDER PAINT COMPOSITIONS

[75] Inventors: Mitsuyuki Mizoguchi, Yokohama; Yoshiro Fuseya, Hiratsuka; Yoshihiro Fujita, Yokohama; Yukiatsu Ishino, Yokohama; Masashi Seki, Yokohama; Takahisa Miyawaki, Yokohama, all of Japan

[73] Assignee: Mitsui Chemicals, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,104

[22] Filed: Apr. 23, 1997

Related U.S. Application Data

[63] Continuation of application No. 08/490,556, Jun. 15, 1995, abandoned.

[51] Int. Cl.[7] ........ C08L 33/00

[52] U.S. Cl. ........ 523/201; 524/300; 524/548; 524/558; 524/904; 525/83; 525/208; 525/902; 525/934

[58] Field of Search ........ 523/201; 524/904, 524/300, 548, 558; 525/208, 902, 934, 83

[56] References Cited

U.S. PATENT DOCUMENTS

| | | | |
|---|---|---|---|
| 3,817,946 | 6/1974 | Ree | 524/904 |
| 3,943,082 | 3/1976 | Smith et al. | 524/904 |
| 3,970,725 | 7/1976 | Tugukuni et al. | 524/904 |
| 4,374,954 | 2/1983 | Labana et al. | 524/904 |
| 4,772,645 | 9/1988 | Tarbutton et al. | 523/457 |
| 5,470,893 | 11/1995 | Sinclair-Day et al. | 523/200 |

FOREIGN PATENT DOCUMENTS

| | | |
|---|---|---|
| 0254523 | 7/1987 | European Pat. Off. . |
| 0560189 | 3/1993 | European Pat. Off. . |
| 0593297 | 10/1993 | European Pat. Off. . |
| 0596627 | 10/1993 | European Pat. Off. . |
| 4139382 | 11/1991 | Germany . |
| 4302393 | 1/1993 | Germany . |

OTHER PUBLICATIONS

Chem Abstracts File "Registry" Search report, pp. 1–6, Nov. 26, 1998—"Paralod KH 3345" Nov. 1998.

*Primary Examiner*—Andrew E. C. Merriam
*Attorney, Agent, or Firm*—Burns, Doane, Swecker & Mathis, L.L.P.

[57] ABSTRACT

A thermosetting powder paint composition comprising:

(A) a (meth)acrylic copolymer having glycidyl groups;

(B) a polybasic carboxylic acid and/or polybasic carboxylic anhydride; and (C) particles having a core/shell structure each comprising a core having Tg of 20° C. or below, the core being covered at least partially with a shell having Tg of 40° C. or above, and said shell having no glycidyl group.

The paint composition is excellent in weather resistance as well as in impact resistance and chipping resistance.

16 Claims, No Drawings

POWDER PAINT COMPOSITIONS

This application is a continuation, of Application Ser. No. 08/490,556, filed Jun. 15, 1995 (now abandoned).

BACKGROUND OF THE INVENTION a. Field of the Invention

The present invention relates to a thermosetting powder paint composition excellent in weather resistance as well as in impact resistance and chipping resistance.

b. Description of the Prior Art

[Trend of Research and Development in the Technical Field of Paint and Expectation for Powder Type Paint from the Viewpoint of Ecological Point]

In recent years, expectations for powder type paints have been growing larger in place of solvent type paints in the technical field of paints from the viewpoint of local or global preservation of the environment, occupational safety and health and environmental improvement, prevention of fire and explosion, saving of resources, and the like.

Further, as expectations have been growing larger for highly functionalized and diversified powder type paints by historical and social requests, there have been increasing demands for powder type paints having high film performances (e.g. impact resistance, resistance to acid rain, etc.) comparable with solvent type paints. However, although film performances demanded for powder type paints have become strict, powder type paints entirely meeting such demands have not been available on the market.

Illustrative examples of conventional powder paints may embrace, for example, epoxy resin and polyester resin powder paints prepared primarily from bisphenol A. However, these paints have had problems not only in weather resistance but also in resistance to acid rain which has recently and particularly become a problem in keeping with the acidification of the environment. Therefore, the powder paints have problems in applications premised on outdoor use such as car body coating.

To overcome these defects, an acrylic powder paint was proposed in Japanese Patent Publication No. 38617/1973 to achieve a remarkable improvement in weather resistance. However, the acrylic powder paint is also inferior to conventional polyester powder paints in impact resistance.

In other words, powder type paints satisfying all of weather resistance, resistance to acid rain and impact resistance were not available on the market. Thus, powder type paints satisfying all of weather resistance, resistance to acid rain and impact resistance have been demanded from the market, and research and development have been made energetically so as to market such paints.

[Prior Art Relating to Improvement in Impact Resistance of Acrylic Powder Paint Films]

In such circumstances of development in the impact resistance of the acrylic powder paint films, techniques of below (1) to (3) by way of example have been disclosed. However, it cannot be mentioned yet that any decisive solution have been found. For instance, improvements were attempted in low-temperature curability and recoating properties, (1) by mixing a dibasic acid, etc. (Japanese Patent Laid-Open No. 112743/1993) and (2) by mixing an alkyl titanate in the technique of (Japanese Patent Laid-Open No. 165463/1988), respectively. In both the techniques, however, impact resistance was mentioned only as a secondary effect which was insufficient.

(1) Japanese Patent Laid-Open No. 112743/1993:

In Japanese Patent Laid-Open No. 112743/1993 (title: Pulverulent Coating Composition, applicant: Hoechst AG), a technique is disclosed to obtain a pulverulent coating composition excellent in curability.

Specifically, there is disclosed a technique concerning a pulverulent coating composition comprising (A) a copolymer having glycidyl groups, (B) an aliphatic or alicyclic dibasic acid, an anhydride thereof or a polyol-modified anhydride of the dibasic acid, and (C) a pigment and other additives as required.

Here, the copolymer (A) has a number average molecular weight (Mn) of 1,000 to 10,000 and a glass transition temperature of 30 to 90° C. and comprises (a) at least 20% by weight of acrylate or glycidyl methacrylate, (b) 35 to 50% by weight of styrene, (c) 10 to 45% by weight of one or more alkyl esters of an aliphatically unsaturated monocarboxylic acid or dicarboxylic acid, and (d) 0 to 50% by weight of one or more other olefinically unsaturated monomers.

In this technique, however, impact resistance was mentioned only as a secondary effect which was insufficient.

(2) Japanese Patent Laid-Open No. 165463/1988:

In Japanese Patent Laid-Open No. 165463/1988 (title: Thermosetting Acrylic Resin Powder Paint Composition, applicant: Kansai Paint Co., Ltd.), a technique is disclosed regarding a thermosetting acrylic resin powder paint composition which is composed principally of a specific glycidyl-functional acrylic resin, an aliphatic dibasic acid (anhydride) and an alkyl titanate compound. The composition melts and cures at low temperatures, and moreover gives paint films excellent in hardness, impact resistance, flexing resistance and the like.

Specifically, the technique concerns a thermosetting acrylic resin powder paint composition which is composed mainly of (A) a glycidyl-functional acrylic resin obtained by copolymerizing primarily 1–14 carbon alkyl ester of (meth) acrylic acid and a glycidyl ester of (meth)acrylic acid, (B) an aliphatic dibasic acid (preferably adipic acid, sebacic acid, decandioic acid, muconic acid, etc.) or an anhydride thereof, and (C) an alkyl titanate compound represented by formula $Ti(OR)_4$ (wherein R is an alkyl group having 15 to 20 carbon atoms) (e.g. tetrapentadecyl titanate, etc.).

In this technique, however, impact resistance was mentioned only as a secondary effect which was insufficient.

(3) Japanese Patent Publication No. 25709/1987:

In Japanese Patent Laid-Open No. 230068/1984 (Japanese Patent Publication No. 25709/1987, Registration No. 1417360, title: Novel Epoxy Resin Composition for Powder Paint, applicant: Asahi Chemical Industry Co., Ltd.), a technique is disclosed regarding a novel epoxy resin composition for a powder paint which comprises an epoxy resin and a specific amount of a specific epoxidized rubber, is excellent in impact resistance, flexibility and corrosion resistance, and does not lose impact absorbing capacity even at low temperatures.

Specifically, there is disclosed a technique concerning a novel epoxy resin composition for a powder paint which comprises (A) 97 to 65 parts (by weight) of an epoxy resin having two or more epoxy groups in the molecule and an epoxy equivalent of 400 to 2,500 and (B) 3 to 35 parts of a rubber component of an epoxidized rubber formed by grafting (1) base layer rubber particles having a toluene-insoluble gel content of 50% or more with (2) a polymerizable epoxy compound having 0.5 or more epoxy group and 0.1 to 1.0 acryloyl group per molecule and/or a monoethylenic glycidyl ester or ether and (3) an ethylenic monomer.

Then, the composing elements, the action and effect of the above technique are summarized below.

i) Resin Component:

The resin component used in the above technique is an "epoxy resin". The concept of the term "epoxy resin" used in the above technique textually includes not only epoxy resins in a narrow sense (epoxy resins of bisphenol A diglycidyl ether base) but also epoxy resins in a broad sense (resins having two or more epoxy groups in the molecule). Here, the epoxy resins in a narrow sense are epoxy resins of bisphenol A diglycidyl ether base which have industrially the largest, overwhelming share and are commonly referred simply to as "epoxy resin" as a usual practice by persons skilled in the art.

However, only epoxy resins in a narrow sense are mentioned in all the descriptions including the best mode as the epoxy resins of the above technique. Hence, no disclosure is made on epoxy resins in a broad sense except the above epoxy resins in a narrow sense.

ii) Curing Agent Component:

The curing agent used in the above technique is not particularly limited. Specific examples of the curing agent used in the above technique include novolak phenol resins, dicyandiamide, imidazoles, hydrazides, aromatic amines and acid anhydrides.

iii) Rubber Particles:

In the above technique, rubber particles having specific conditions are one of the composing elements of the invention in order to improve the impact resistance of paint films by forming the paint films having an ocean-island structure consisting of a continuous phase (ocean) of a resin crosslinked by a curing agent and a dispersed phase (islands) of the rubber particles.

The rubber particles having specific conditions are formed by introducing epoxy groups or glycidyl groups into the surface of the particles.

The reason for introducing a specific amount of epoxy group into the surface of rubber particles is conceivably to improve the compatibility or interfacial adhesion between an ocean and islands, because in a multiphase polymer matrix having an ocean-island structure, the interfacial energy or compatibility between an ocean and islands is important in order to secure the uniformity of the matrix.

iv) Action, Effect and Applications:

In the above technique, illustrative examples of its applications include external painting of steel pipes, coating of steel bars, electrical insulation and paints, for which a high impact resistance is demanded.

(4) Difference between Japanese Patent Publication No. 25709/1987 and the present invention:

The difference between Japanese Patent Publication No. 25709/1987 and the present invention is illustrated hereunder.

i) Resin Component:

The resin component used in the above technique is a "epoxy resin". The present inventors have examined zealously paint films which are hit by gravels and pebbles at a high relative speed during traveling and exposed to the sunlight and severe weather conditions in the open air without any shelters, like those on the surface of bodies and chassis of vehicles such as automobiles. As a result, it was confirmed that the best mode of the above technique were inferior in chipping resistance, weather resistance and appearance.

Judging from the disclosure regarding the applications of the above technique, it is thought that the inventors of the above technique did not expect such applications of paint films as on the surface of bodies and chassis of vehicles such as automobiles mentioned above. Namely, it is assumed that they expected the applications indoors or outdoors with shelters.

Separately, the resin component used in the present invention is an acrylic or methacrylic resin having two or more epoxy groups in the molecule, which exhibits an excellent weather resistance even in such applications.

Namely, the resin component used in the present invention contributes greatly to exhibit excellence in appearance, impact resistance and chipping resistance in the constitution of the present invention when it is hit by gravels and pebbles at a high relative speed during traveling and is exposed to the sunlight and severe weather conditions in the open air without shelters, in the applications for the surface of bodies and chassis of vehicles such as automobiles in which excellent appearances (smoothness, clear brilliance, etc.) are demanded.

As mentioned above, the resin component used in the present invention is textually included in the concept of the epoxy resin defined in the above technique. However, it is not disclosed concretely in that. Therefore, from the viewpoint of the action and effect of weather resistance including ultraviolet light resistance and sunlight resistance, the resin component used in the present invention is a lower concept which is selected from the concept of the epoxy resin defined in the above technique. The lower concept is not disclosed concretely in the above technique and gives remarkable unexpected effects by being combined with the other components.

ii) Curing Agent Component:

The curing agent used in the above technique is not particularly limited.

The present inventors have examined zealously paint films which are hit by gravels and pebbles at a high relative speed during traveling and exposed to the sunlight and severe weather conditions in the open air without any shelters, like those on the surface of bodies and chassis of vehicles such as automobiles. As a result, it was confirmed that paint films, in which the composing element of rubber particles was excluded from the best mode of the above technique, were inferior in impact resistance, weather resistance and appearance.

On the other hand, the curing agent used in the present invention is at least one polybasic carboxylic compound (B) selected from the group consisting of poly-basic carboxylic acids (b1) and polybasic carboxylic anhydrides (b2). Specific examples thereof are described below.

The curing component used in the present invention contributes greatly to exhibit excellence in appearance, impact resistance and chipping resistance in the constitution of the present invention when it is hit by gravels and pebbles at a high relative speed during traveling and is exposed to the sunlight and severe weather conditions in the open air without shelters, in the applications for the surface of bodies and chassis of vehicles such as automobiles in which excellent appearances (smoothness, clear brilliance, etc.) are demanded.

As mentioned above, the curing agent component used in the present invention is textually included in the concept of the curing agent of the above technique. However, from the viewpoint of giving unexpectedly remarkable action and effect in impact resistance and chipping resistance by selecting the specific curing agent and combining it with the other specific resin component and rubber particles, the curing agent component used in the present invention is a lower concept specifically selected from the concept of the curing agent in the above technique.

iii) Rubber Particles:

In the above technique, the rubber particles wherein a specific amount of epoxy group (0.5 or more epoxy group per molecule of the polymer) is introduced into the surface of the particles, are one of composing elements of the invention.

The reason for introducing a specific amount of epoxy group into the surface of rubber particles is conceivably to improve the compatibility or interfacial adhesion between an ocean and islands in a multiphase polymer matrix having an ocean-island structure, as mentioned above.

The present inventors have examined zealously paint films which are hit by gravels and pebbles at a high relative speed during traveling and exposed to the sunlight and severe weather conditions in the open air without any shelters, like those on the surface of bodies and chassis of vehicles such as automobiles. As a result, it was confirmed that although the best mode of the above technique was superior in impact resistance, it was inferior in both chipping resistance and film appearance.

In the above technique, epoxy group which is a common functional group for an ocean and islands is arranged at high densities in both the ocean and the islands in order to improve the compatibility or interfacial adhesion between the ocean and the islands. Here, the present inventors have thought that the crosslinking density between an ocean and islands is therefore too high and the super local elastic modulus around islands is also too high, so that the paint film can not absorb local impacts completely and hence has an inferior chipping resistance (local impact resistance).

Separately, the rubber particles used in the present invention do not need such introduction of epoxy group into the surface of the particles. In the present invention, the particles (C) having a core/shell structure which constitute a dispersed phase (islands) can realize an uniform multiphase polymer system by selecting a monomer whose polymer has a solubility parameter (SP value) near that of an acrylic or methacrylic resin constituting a continuous phase (ocean) as monomer units in the molecule of a shell (particle surface) polymer or by introducing a suitable compatibilizer as a third component, without introducing epoxy or glycidyl group entirely or at a high density into the surface of the particles.

The particle component used in the present invention contributes greatly to exhibit not only excellent impact resistance but also excellent chipping resistance and excellent appearance in the constitution of the present invention when it is hit by gravels and pebbles at a high relative speed during traveling and is exposed to the sunlight and severe weather conditions in the open air without shelters, in the applications for the surface of bodies and chassis of vehicles such as automobiles, in which excellent appearances (smoothness, clear brilliance, etc.) are demanded.

Therefore, the particles having a core/shell structure used in the present invention are not included in the rubber particles of the above technique.

iv) Action, Effect and Applications:

In the above technique, illustrative examples of its applications include external painting of steel pipes, coating of steel bars, electrical insulation and paints, for which a high impact resistance is demanded. The above technique discloses an improvement in the impact resistance of paint films particularly at low temperatures as the action and effect of the invention.

It is thought as described above that the inventors of the above technique do not expect applications under such conditions that the coating surface is hit by gravels and pebbles at a high relative speed during traveling or exposed to the sunlight and severe weather conditions in the open air without shelters, like the surface of bodies and chassis of vehicles such as automobiles.

On the other hand, the action and effect of the present invention is to realize concurrently excellent weather resistance, chipping resistance, impact resistance and external characteristics, which are difficult to obtain by the paint film of the above technique.

Accordingly, the present invention can be applied very preferably to paint films in the foregoing applications in which the above technique is hard to employ.

v) Difference between Japanese Patent Publication No. 25709/1987 and the present invention:

As is obvious from the above 1) to iv), Japanese Patent Publication No. 25709/1987 is different from the present invention in the composing elements and action and effect.

Namely, by adopting a constitution different from that of the above technique, the present invention can be applied very favorably to paint films which are hit by gravels and pebbles at a high relative speed during traveling or exposed to the sunlight and severe weather conditions in the open air without shelters, like those on the surface of bodies and chassis of vehicles such as automobiles, to which the above technique is hard to apply.

[Chipping Resistance]

The concept of the term "chipping" used in the claims or the specification of the present application includes the phenomenon of impact fracture upon loading on a pin-point in a short time, and particularly in the technical field of car paints, also includes the phenomenon of flawing which car body paint films suffer upon hitting flying pebbles.

The concept of the term "chipping resistance" used in the claims or the specification of the present application embraces the resistance of paint films to "chipping".

Specific examples of the method for evaluation of chipping resistance include, for example, the scattering stone test by a gravellometer according to SAE-J400 and ASTM D-370 employed in the United States which are evaluation methods for paint films for automobiles. In these evaluation methods, chipping resistance is determined by hitting pebbles of a given particle size against a paint film by a given force to evaluate the diameter of thereby caused flaws in the paint film.

[Impact Resistance]

The concept of the term "impact resistance" used in the claims or the specification of the present application includes the phenomenon of impact fracture upon loading over a wide area in a short time and, particularly in the technical field of car paints, also includes the phenomenon of flawing which car body paint films sustain upon hitting a large object.

Illustrative examples of the method for evaluating impact resistance may embrace, for example, the impact resistance test (Du Pont impact test) according to JIS K5400 6. 13. 3. In such an evaluation test, impact resistance is judged by evaluating a drop height at which cracking and scaling occur in a paint film when a weight (500 g or 1 kg) is dropped onto the paint film.

[Correlation Between Impact Resistance and Chipping Resistance]

Formerly, the difference of concept between impact resistance and chipping resistance of paint films has scarcely been recognized in the technical field of powder paints. Further, little attention has been paid to the importance of the chipping resistance of paint films, though the impact resistance of paint films has been regarded as important. In other words, although the impact resistance of paint films has been evaluated, the chipping resistance of paint films has hardly been evaluated. Further, no investigation has been made on the correlation between impact resistance and chipping resistance. The excellence in impact resistance did not necessarily mean excellence in chipping resistance.

For instance, in Japanese Patent Laid-Open No. 221567/1991, a technique is disclosed wherein a powder paint film is cured by an acid/isocyanate reaction to improve the impact resistance of the paint film. Even in the Japanese Patent Laid-Open No. 221567/1991, the concept of the chipping resistance of paint films is not thought of at all. Further, only the impact resistance of paint films is regarded as important, but no attention is paid at all to the importance of the chipping resistance of paint films.

From such backgrounds, the present inventors have noticed the correlation between impact resistance and chipping resistance of a paint film formed by a powder paint.

For example, U.S. Pat. No. 3,845,016 (Santokh S. Labana et al.), U.S. Pat. No. 3,919,347 (Themistoklis Katsimbas et al.), Japanese Patent Laid-Open No. 112743/1993, etc. describe that powder paint films cured by a glycidyl group/acid anhydride group reaction are inferior in impact resistance.

The present inventors tested the paint films disclosed therein on the impact resistance. Then, these films were found definitely to be inferior in impact resistance. At the same time, the present inventors individually tested on the chipping resistance. Then, it was confirmed that in spite of inferiority in impact resistance, the films had a superior chipping resistance conversely.

Thus, it was affirmed that there was no correlation between impact resistance and chipping resistance so far as at least these cases were concerned.

The present inventors have taken up as a problem to be solved imparting not only an impact resistance but also a chipping resistance to paint films formed by a powder paint, based on this result and noting the fact that persons skilled in the art have taken up impact resistance as a problem to be solved but have hardly taken up chipping resistance as the problem in the prior art of powder paints including acrylic ones.

From such points of view, the present inventors have proceeded with an intensive investigation based on an absolutely new technical idea. The new technical idea is to apply the concept of the toughening mechanism of a microphase separated structure in the technical field of "polymer alloy" or "polymer blend" in the region of the polymer chemistry into the technical field of powder paints, so that imparting simultaneously an impact resistance and chipping resistance to paint films.

In contrast to the prior art, the present invention has a novelty in that an excellent impact resistance and chipping resistance are granted to the whole paint film owing to the impact resistance of a particles having a core/shell structure. The particles having a core/shell structure are formed by arranging a polymer having a calculated glass transition point of 20° C. or below in the core and a polymer having a calculated glass transition point of 40° C. or above in the shell, and the particles are uniformly held or contained as a dispersed phase (islands) in a continuous phase (ocean) comprising a organic polymer by the three dimensional crosslinked network structure or IPN (interpenetrating network) structure of the organic polymer.

SUMMARY OF THE INVENTION

The object of the present invention is, in view of the problems of the prior art as described above, to provide an acrylic powder paint improved in weather resistance which is a defect of epoxy resin powder paints and polyester powder paints, and the paint having an excellent impact resistance comparable with polyester powder paints and is superb in chipping resistance which hardly attracted the attention of persons skilled in the art.

The present inventors have made intensive examinations to solve the above problems of the prior art. As a result, it has been found that not only a high impact resistance (impact resistance measured by the conventional Du Pont impact test) but also a high chipping resistance (impact resistance measured by the scattering stone test by loading a pinpoint concentrated load) are attained in a paint film by a novel attempt of uniformly dispersing particles having a core/shell structure each comprising a core having a calculated glass transition point of 20° C. or below, the core being covered at least partially with at least one shell having a calculated glass transition point of 40° C. or above, in a phase formed by at least one acrylic copolymer having an epoxy groups (glycidyl groups) and a polybasic carboxylic acid and/or the anhydride thereof. The present invention has been completed on the basis of this finding.

Namely, the aforementioned object of the present invention is achieved by a thermosetting powder paint composition which comprises:

- at least one acrylic and/or methacrylic copolymer (A) obtained by polymerization in a reaction system containing an ethylenic unsaturated monomer having at least one glycidyl group and at least one unsaturated double bond in the molecule as a monomer (a1) and an ethylenic unsaturated monomer having at least one unsaturated double bond and no glycidyl group in the molecule as a monomer (a2);
- at least one polybasic carboxylic compound (B) selected from the group consisting of polybasic carboxylic acids (b1) and polybasic carboxylic anhydrides (b2); and
- particles (C) having a core/shell structure each comprising a core having a calculated glass transition point of 20° C. or below, the core being covered at least partially with at least one shell having a calculated glass transition point of 40° C. or above, and said shell substantially having neither epoxy group nor glycidyl group.

Description of the Preferred Embodiments

[Acrylic and/or Methacrylic Copolymer (A)]

The acrylic and/or methacrylic copolymer (A) is obtained by a polymerization in a reaction system containing an ethylenic unsaturated monomer having at least one glycidyl group and at least one unsaturated double bond in the molecule as a monomer (a1) and an ethylenic unsaturated monomer having at least one unsaturated double bond but no glycidyl group in the molecule as a monomer (a2).

The resin component (A) used with the curing agent component (B) in the present invention contributes greatly to exhibit excellence in appearance, impact resistance and chipping resistance in the constitution of the present invention when it is hit by gravels and pebbles at a high relative speed during traveling and is exposed to the sunlight and severe weather conditions in the open air without shelters, in the applications for the surface of bodies and chassis of vehicles such as automobiles in which excellent appearances (smoothness, clear brilliance, etc.) are demanded.

The arrangement style of the copolymer may be any of random copolymer, alternating copolymer, block copolymer and graft copolymer. The copolymer may be any of linear, large circular, branched, stellate and three-dimensional net-like.

[Monomers (a1) and (a2)]

Illustrative examples of the ethylenic unsaturated monomer (a1) having at least one glycidyl group and at least one unsaturated double bond in the molecule which is used in the preparation of the acrylic and/or methacrylic copolymer (A), may include, for instance, glycidyl methacrylate, glycidyl acrylate, methylglycidyl methacrylate, methylglycidyl acrylate and acryl glycidyl ether. They can be used singly or in combination.

Illustrative examples of the ethylenic unsaturated monomer (a2) having at least one unsaturated double bond but no glycidyl group in the molecule which is used in the preparation of the acrylic and/or methacrylic copolymer (A), may include acrylic or methacrylic derivatives in-cluding methyl-, ethyl-, n-propyl-, isopropyl-, n-butyl-, isobutyl-, sec-butyl-, tert-butyl-, n-amyl-, isoamyl-, n-hexyl-, cyclohexyl-, 2-ethylhexyl-, octyl-, 2-ethyloctyl-, decyl-, dodecyl-, octadecyl-, stearyl-, cyclohexyl-, benzyl-, phenyl-, hydroxyethyl-, 2-hydroxypropyl-, 3-hydroxypropyl-, 2-hydroxybutyl-, 3-hydroxybutyl-, 4-hy-droxybutyl-, polyethylene glycol mono-, 1,4-butanediol mono- and dimethylamino- acrylates and methacrylates; esters of dicarboxylic acids such as maleic acid and itaconic acid; amides such as vinylamide, acrylamide, methacrylamide, N-methylol-acrylamide, N-methylolmetha-crylamide, diacetoneacrylamide and diacetonemethacrylamide. They can be used singly or in combination.

The other illustrative examples of the ethylenic unsaturated monomer (a2) having at least one unsaturated double bond but no glycidyl group in the molecule which is used in the preparation of the acrylic and/or methacrylic copolymer (A), may embrace ethylenic unsaturated monomers including aromatic vinyls such as styrene, α-methylsty-rene, vinyltoluene, t-butylstyrene, chlorostyrene, vinylanisole, vinylnaphthalene and divinylbenzene; halogenated ethylenic unsaturated monomers such as vinyl chloride, vinylidene chloride, vinyl fluoride, monochloro-trifluoroethylene, tetrafluoroethylene and chloroprene; nitriles such as acrylonitrile and methacrylonitrile; vinyl esters such as vinyl acetate and vinyl propionate; α-olefins such as ethylene, propylene, isoprene, butadiene and α-olefins having 4 to 20 carbon atoms; alkyl vinyl ethers such as lauryl vinyl ether; and nitrogenous vinyls such as vinylpyrrolidone and 4-vinylpyrrolidone. They can be used singly or in combination.

The ratio of an acrylic and/or methacrylic monomer is generally 60 to 100 mole %, preferably 80 to 100 mole %, per total monomers used for preparing the acrylic and/or methacrylic copolymer (A). In case that the ratio of an acrylic and/or methacrylic monomer is less than 60 mole % and that aromatic vinyl monomers such as styrene is used in a large ratio as the other monomer (more than 40 mole %), the weather resistance of paint film tends to be decreased. In case that nitriles such as acrylonitrile is used in a large ratio, the appearance of paint film tends to be decrease by coloring.

The concept of the term "derivative" used in the claims or the specification of the present application includes specific compounds of which hydrogen atom(s) is replaced by the other atom(s) or atom group(s) R.

Here, R is a monovalent hydrocarbon group having at least one carbon atom. More particularly, it is an aliphatic group, an alicyclic group with a substantially low degree of aromatization, a group formed by combining these groups together, or a divalent residue formed by combining these groups with a hydroxyl group, carboxyl group, amino group, nitrogen, sulfur, silicon, phosphorus, etc. Among these, a group having an aliphatic structure in a narrow sense is particularly preferred. R may be an above-described group for which, for example, an alkyl group, cycloalkyl group, allyl group, alkoxyl group, cycloalkyl group, allyloxyl group, halogen (F, Cl, Br, etc.) atom or the like is substituted. By selecting these substituents properly, it is possible to control the properties of paint films formed by the powder paint composition according to the present invention.

[Calculated Glass Transition Point of Acrylic and/or Methacrylic Copolymer (A)]

In consideration of the storage stability of the paint composition and the film smoothness related to the reduction in fluidity of the paint composition during paint baking, the calculated glass transition point of the acrylic and/or methacrylic copolymer (A) is preferably from 20 to 120° C., more preferably from 40 to 110° C. in general.

[Number Average Molecular Weight of Acrylic and/or Methacrylic Copolymer (A)]

For similar reasons, the number average molecular weight of the acrylic and/or methacrylic copolymer (A) ranges preferably from 1,000 to 10,000 in general. Here, the number average molecular weight can be measured by gel permeation chromatography (GPC) using polystyrene as the standard.

[Epoxy Equivalent of Acrylic and/or Methacrylic Copolymer (A)]

If the epoxy equivalent of copolymer (A) is inappropriate, the low-temperature curing of the paint composition is not achieved upon paint baking so that the paint film becomes insufficient in curability and reduced in solvent resistance. Further, the surface of the film is not smooth and a preferable film appearance is hardly obtained. In view of these problems, the charge ratio of the ethylenic unsaturated monomer (a1) having at least one glycidyl group (epoxy group) and at least one unsaturated double bond in the molecule is so controlled that the epoxy equivalent of the acrylic and/or methacrylic copolymer (A) may become preferably from 200 to 1,000 g/eq, more preferably from 300 to 800 g/eq in general. Here, an epoxy equivalent is a gram number of a resin for each gram equivalent of epoxy group and expressed in a unit of g/eq.

As an ordinary method for measuring the amount of glycidyl groups in a resin to define the epoxy equivalent, the resin is reacted with a ring-opening agent which can open the glycidyl groups of the resin under atmosphere containing the excess agent, and then the unreacted ring-opening agent is titrated. There is, for example, "Pyridine hydrochloride method" and "Perchloric acid method" as such ordinary method. They can be applied for the copolymer (A). In the former method, combination of pyridine hydrochloride solution/methanol solution of phenolphthalein+Thymol Blue/methanol solution of KOH is applied as combination of ring-opening agent/titration indicator/titration agent. In the latter method, combination of glacial acetic acid+cetyl trimethyl ammonium bromide/acetic acid solution of Patent Blue NA+methanol solution of Thymol Blue/acetic acid (anhydride) solution of perchloric acid is applied. In the both methods, the epoxy equivalent is obtained according the following formula.

$$\text{Epoxy Equivalent} = \frac{W \times 10^3}{(X \times F) \times (V_1 - V_2)}$$

W: weight of the resin (g)

X: a concentration of titration liquid expressed by N (mol/L)

F: a factor of titration liquid $V_1$: a titration amount into the resin solution (ml)

$V_2$: a titration amount into a blank (ml)

[Synthesis of Acrylic and/or Methacrylic Copolymer (A)]

No particular restriction is placed on the process for the synthesis of the acrylic and/or methacrylic copolymer (A) so far as the process can prepare the copolymer having substantially desired properties. The acrylic and/or methacrylic copolymer (A) can be synthesized by common processes of public knowledge or use. The acrylic and/or methacrylic copolymer (A) can be prepared by a radical polymerization process including solution polymerization, emulsion polymerization, suspension polymerization and bulk polymerization. A solution polymerization process is preferably used in particular.

Further, as a method for controlling the molecular weight of the acrylic and/or methacrylic copolymer (A), such a means is employed that the polymerization is effected in the presence of a chain transfer agent or an organic solvent having a large chain transfer effect. The chain transfer agent is, for example, mercaptans such as dodecyl mercaptan; disulfides such as dibenzoyl sulfide; 1–18 carbon alkyl esters of thioglycolic acid such as 2-ethylhexyl thioglycolate; and halogenated hydrocarbons such as urea tetrabromide. The organic solvent is, for example, isopropyl alcohol, isopropylbenzene and toluene.

[Polybasic Carboxylic Compound (B)]

The polybasic carboxylic compound (B) is at least one compound selected from the group consisting of polybasic carboxylic acids (b1) and polybasic carboxylic acid anhydrides (b2). The compound (B) is a curing agent component which reacts with glycidyl groups in the molecule of the acrylic and/or methacrylic copolymer (A).

Any of aliphatic, aromatic and alicyclic polybasic carboxylic compounds may be used as the compounds (B). Illustrative examples of aromatic polybasic carboxylic acids include, for example, isophthalic acid and trimellitic acid. They can be used singly or in combination. Illustrative examples of alicyclic polybasic carboxylic acids include, for example, hexahydrophthalic acid and tetrahydrophthalic acid. They can be used singly or in combination. Further, polyester resins and the like containing carboxyl groups may also be used.

In the present invention, however, aliphatic polybasic carboxylic compounds are preferably used in view of the film properties including smoothness, impact resistance, weather resistance and the like.

The concept of the term "aliphatic" used in the claims or the specification of the present application may embrace not only aliphatics in a narrow sense but also alicyclics with a substantially low degree of aromatization. Namely, the concept of the term of "aliphatic" compounds includes a group of compounds with a substantially low degree of aromatization, which have in the molecule a divalent hydrocarbon group containing at least one carbon atom. Specifically, the concept includes not only aliphatic groups in a narrow sense, but also alicyclic groups with a substantially low degree of aromatization, groups formed by combining these groups, and a group of compounds, which have in the molecule a divalent residue formed by combining above groups with a hydroxyl group, nitrogen, sulfur, silicon, phosphorus, and the like. Further, specifically, the concept also includes a group of compounds which have in the molecule a group formed by replacing above groups with, for example, an alkyl group, cycloalkyl group, allyl group, alkoxyl group, cycloalkoxyl group, allyloxyl group, halogen (F, Cl, Br, etc.) atom or the like. By selecting these substituents properly, it is possible to control the properties (heat resistance, toughness, degradability, strength characteristics, etc.) of the copolymer according to the present invention.

The concept of the term of an "aliphatic" compound used in the claims or the specification of the present application includes not only one kind of aliphatic compound but also a combination of two or more kinds of aliphatic compounds.

Examples of the aliphatic polybasic carboxylic compound are illustrated hereinafter.

[Aliphatic Polybasic Carboxylic Acid (b1)]

No particular restrictions are placed on the aliphatic polybasic carboxylic acid (b1), so far as it is substantially an aliphatic compound having at least two carboxyl groups in the molecule. They can be used singly or in combination.

Illustrative examples of the aliphatic polybasic carboxylic acid (b1) include aliphatic dicarboxylic acids. Illustrative examples of the aliphatic dicarboxylic acids include, for example, succinic acid, glutaric acid, adipic acid, pimelic acid, suberic acid, azelaic acid, sebacic acid, citric acid, maleic acid, citraconic acid, itaconic acid, glutaconic acid, undecandioic acid, dodecandioic acid, pentadecandioic acid, tridecandioic acid, tetradecandioic acid, hexadecandioic acid, octadecandioic acid, eicosandioic acid, docosandioic acid, tetradocosandioic acid, and the like. Among these, dodecandioic acid is preferred. They can be used singly or in combination.

[Aliphatic Polybasic Carboxylic Anhydride (b1)]

The concepts of the terms "anhydride", "anhydride group", "anhydride bond" and "polyanhydride" used in the claims or the specification of the present application include the concepts of the respective terms described in "MARUZEN, Concise Enzyclopedia of Polymer Science and Engineering" published by MAREZEN, 1994, pp996–998 (polyanhydrides). The concepts of the terms "acid anhydride" and "anhydride" used in the claims or the specification of the present application are concepts equivalent to each other and also include the concept described in "Kagaku Daijiten (Concise Enzyclopedia of Chemistry)", Vol. 3, published by Kyoritsu Publishing Co., 1963, left column on p996—right column on p997 (acid anhydrides).

In the present invention, polybasic carboxylic linear anhydrides are preferred from the viewpoint of crosslinking effect and the like. Examples of the polybasic carboxylic linear anhydrides are described hereinafter.

No particular limitation is imposed on the linear anhydride (b2) so far as it is an acid anhydride of aliphatic compounds substantially having or do not having carboxyl group(s) in the molecule, and is a linear oligo(dimer or above)- or poly-aliphatic acid anhydride, and has substantially at least two of carboxyl group and/or acid anhydride group in the molecule. It can be used singly or in combination.

In the claims or the specification of the present application, the concept of the term "linear" include not only linear but also the case in which a linear oligo(dimer or above)- or poly-aliphatic acid anhydride forms a large cycle.

Specific examples of the aliphatic polybasic carboxylic linear anhydride (b2) include linear polycondensates obtained by the dehydration condensation of one kind or more of aliphatic polybasic carboxylic acids.

It is possible to represent some of the linear polycondensates obtained by the dehydration condensation of an aliphatic polybasic carboxylic acid by the following general formula which can be used as the aliphatic polybasic carboxylic linear anhydride (b2), and the linear polycondensates are particularly effective in improving chipping resistance.

$HO—[—OC(CH_2)_mCOO—]_n—H$ wherein m is 1 or more, n is 2 or more, and m is preferably 30 or less.

It is also possible to use a linear copolycondensates obtained from two or more kinds of aliphatic polybasic carboxylic acids.

Specific examples of the aliphatic polybasic carboxylic linear anhydride (b2), which is particularly effective in improving chipping resistance, include dehydrated linear condensates of an aliphatic polybasic carboxylic acid (b1). Among these, dehydrated linear condensates of adipic acid, pimelic acid, suberic acid, azelaic acid, sebacic acid, undecanedioic acid, dodecandioic acid, eiconsandioic acid and octadecandioic acid are more preferred, and a dehydrated linear condensate of dodecandioic acid is furthermore preferred.

For example, even paint films prepared from a composition formed by removing the particles (C) having a core/shell structure (which are one of composing elements of the powder paint composition according to the present application) from the powder paint composition are insufficient in impact resistance but show some remarkable improvement effect in chipping resistance.

The aliphatic polybasic carboxylic linear anhydride (b2) is preferably so prepared as to have a melting point in the range of 40 to 150° C.

[Formation of Crosslinking by Aliphatic Polybasic Carboxylic Linear Anhydride (b2)]

When a cyclic anhydride of an (aliphatic) polybasic carboxylic acid such as succinic anhydride and phthalic anhydride is reacted with an acrylic and/or methacrylic copolymer (A), it is quite probable that the anhydride reacts with the epoxy rings of only specific glycidyl groups in one acrylic and/or methacrylic copolymer (A) molecule. Therefore, the effect of crosslinking a plurality of acrylic and/or methacrylic copolymer (A) molecules is small.

On the other hand, when a linear (co-)polycondensate of an aliphatic polybasic carboxylic acid is reacted with the copolymer (A), the condensate is cleaved at the anhydride group parts into a plurality of fragments, each of which is reacted with the glycidyl groups in plural acrylic and/or methacrylic copolymer (A) molecules, thus exhibiting the effect of crosslinking a plurality of acrylic and/or methacrylic copolymer (A) molecules.

[Amount of Polybasic Carboxylic Compound (B)]

The amount of carboxyl group in the polybasic carboxylic acids (b1) is preferably 0.1 to 1.2 equivalents, more preferably 0.2 to 1.1 equivalents, especially more preferably 0.3 to 1.0 equivalent for each equivalent of the glycidyl group in the acrylic and/or methacrylic copolymer (A). The amount of acid anhydride group in the polybasic carboxylic anhydrides (b2) is preferably 0.1 to 1.2 equivalents, more preferably 0.2 to 1.1 equivalents, especially more preferably 0.3 to 1.0 equivalent for each equivalent of the glycidyl group in the copolymer (A). The total amount of the carboxyl group and/or acid anhydride group in the aliphatic polybasic carboxylic compound (B) molecule is preferably 0.5 to 1.3 equivalents, more preferably 0.6 to 1.2 equivalents, especially more preferably 0.7 to 1.0 equivalent for each equivalent of the glycidyl group in the copolymer (A). In case that the amount of aliphatic polybasic carboxylic compound (B) is outside the above ranges, the properties of the paint film such as solvent resistance and impact resistance tend to be degraded.

[Particles (C) having a Core/Shell Structure]

The particles (C) each comprise a core having a calculated glass transition point of 20° C. or below, the core being covered at least partially with at least one shell having a calculated glass transition point of 40° C. or above. In case that a paint film formed by the composition of the present invention, the particles (C) having a core/shell structure are uniformly held or contained as a dispersed phase (islands) in a continuous phase (ocean) comprising a organic polymer by the three dimensional crosslinked network structure or IPN structure of the organic polymer, so that an excellent impact resistance and chipping resistance are granted to the whole paint film owing to the impact resistance of a particles (C) having a core/shell structure.

(1) Concept of terms "core", "shell" and "core/shell":

The terms "core", "shell" and "core/shell" used in the claims or the specification of the present application include entirely the concept which these terms generally have in the polymer chemistry. However, they are not necessarily equivalent to this concept. For example, the "core/shell" particles of the present invention embrace a mode in which a "core" is covered at least partially with a "shell", a mode in which a core or particle has at least one micro void (including void and cavity, the same shall apply hereunder), a mode in which a core or particle has at least one micro void that has at least one passage communicating with the outer space, and the like. Thus, the terms "core", "shell" and "core/shell" used in the claims or the specification of the present application are not necessarily equivalent to the concept which these terms generally have in the polymer chemistry. However, they are used for the sake of convenience in making frequent reference to the substantial "mode" of the heteropolymer system according to the present invention.

The term "core" is generally used in the polymer chemistry equivalently to terms "center", "nucleus", "center" and "seed". The term "shell" is generally used equivalently to terms "skin", "husk", "sheath" and "robe". Accordingly, the term "core" used in the claims or the specification of the present application may also be used equally to the terms "center", "nucleus", "center" and "seed". Similarly, the term "shell" may be used equally to the terms "skin", "husk", "sheath" and "robe".

(2) Concept of Term "Particle":

The concept of the term "particle" used in the claims or the specification of the present application includes entirely the concept which the term generally has in the polymer chemistry. However, it is not necessarily equivalent thereto. The modes (which is observed by a scanning electron microscope) of the "particles" used in the claims or the specification of the present application include, for example, a mode in which particles have many raspherry-like or kompeito (confeito in Portuguese)-like projections, a mode in which particles are flat like erythrocyte, a mode in which particles are of a spheroid like a rugby ball, a mode in which particles are fusiform like colibucillus, a mode in which particles are each a hollow particle having at least one void inside, a mode in which particles are each a hollow particle containing a non-hollow particle therein like a bell, a mode in which particles are each a hollow particle containing successively at least one hollow particle therein like Matryosica (an article of Russian folkcraft), and the like. The concept of the term "particles" used in the claims or the specification of the present application may also include, for example, microspheres for constituting a polymer emulsion, latex and polymer suspension. Thus, the term "particles" used in the claims or the specification of the present application is not necessarily equivalent to the concept which the term generally has in the polymer chemistry. However, the term is used for the sake of convenience in making frequent reference to the substantial "mode" of the heteropolymer system according to the present invention.

(3) Concept of "continuous emulsion polymerization or suspension polymerization","multistage sequential polymerization" or "sequential polymerization":

The concept of the descriptions "continuous emulsion polymerization or suspension polymerization", "multistage sequential polymerization" or "sequential polymerization" used in the claims or the specification of the present application includes a technique of emulsion polymerization or suspension polymerization wherein particles formed in advance in an aqueous continuous phase (aqueous medium), that is seed polymer particles, are applied with a monomer or monomers, and then they are polymerized in one or more subsequent steps to deposit-one or more polymers on the seed polymer particles thereby one or more polymer layers are laminated on them and the particle diameter is increased. Here, the concept of the term "monomer(s)" includes one or more kinds of monomers, while the concept of the term "polymer" embraces a homopolymer and a copolymer. The arrangement style of the copolymer may be any of random copolymer, alternating copolymer, block copolymer and graft copolymer.

(4) Unimodal Sequentially Polymerized Heteropolymer:

In a multistage sequential polymerization, if absolutely no surfactant is added at a stage immediately subsequent to a certain stage, substantially no micelles are formed in the reaction system. Consequently, all the monomer in the reaction system at that stage is captured onto the particles from the reaction system at the immediately preceding stage and intimately combines therewith physically and chemically. When such a reaction mode is adopted consistently in a process for preparing particles, particles having only one kind of core/shell structure or polymer deposited structure should be obtainable in principle, aside from actual results.

These particles are referred to as a "unimodal" sequentially polymerized heteropolymer. The unimodal sequentially polymerized heteropolymer is described in more detail, for example, in from line 31 on column 10 to line 8 on column 11 of Japanese Patent Publication No. 9124/1991 (Kowalski, et al.). The description is regarded as a matter or disclosure understood directly as one meaning by a person skilled in the art, by referring to the description in view of the matter or the disclosure described in the specification of the present application.

(5) Polymodal Sequentially Plymerized Heteropolymer:

Separately, if a surfactant is added in an amount enough to form micelles, that is an amount above CMC (critical micell concentration), at a stage immediately subsequent to a certain stage, some monomer present in the reaction system at that stage is captured onto the particles from the reaction system at the immediately preceding stage and intimately combines therewith physically and chemically. The rest monomer is not captured onto the particles from the reaction system at the immediately preceding stage but is entrapped by the additional micelles to form additional particles. When such a reaction mode is adopted in a process for forming particles, particles having a variety of core/shell structures or polymer deposited structures should be obtainable in principle, aside from actual results.

These particles are referred to as a "polymodal"—for example, "bimodal", "trimodal" or "multimodal"—sequentially polymerized heteropolymer. The polymodal sequentially polymerized heteropolymer is described in more detail, for example, in from line 31 on column 10 to line 8 on column 11 of Japanese Patent Publication No. 9124/1991 (Kowalski, et al.). The description is regarded as a matter or disclosure understood directly as one meaning by a person skilled in the art, by referring to the description in view of the matter or the disclosure described in the specification of the present application.

To realize the formation of intended "monomodal" or "polymodal" particles, it is advisable to properly determine the kind, concentration, addition mode, addition time and period of the surfactant, the relative ratio of the surfactant to the monomer, and the like.

(6) Polymodality of Particles having Core/Shell Structure:

The particles according to the present invention may be either unimodal or polymodal. When the particles are polymodal, they are commonly preferred to be bimodal. Further, when the particles are polymodal, the main mode constitutes preferably about 60% to about 90%, more preferably about 75% to about 85% of the particles in general.

(7) Seed Polymer:

The concept of the term "seed polymer" used in the claims or the specification of the present application may include polymer particles formed in advance, namely polymer particles formed in the first stage of polymerization or polymer particles formed in any stage except the final stage of sequential polymerization. Therefore, polymer particles, which are formed in one or more sequential stages and are to be provided with shells afterward are themselves referred to as a seed polymer for the succeeding stage where a shell-forming polymer is deposited on the seed polymer particles. Thus, a seed polymer or cores can be prepared in a single stage or a step or steps of sequential polymerization.

(8) Evaluation of Glass Transition Point (Tg) of Heteropolymer:

The glass transition point (Tg) of a polymer having a specific monomer composition can be determined by calculation according to a Fox's equation. Here the Fox's equation is for calculating the Tg of a copolymer on the basis of the Tg of the homopolymer of each monomer for forming the copolymer. The detail is described in Bulletin of the American Physical Society, Series 2) Vol. 1, No. 3, p123 (1956). All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

The Tg of the homopolymers of various ethylenic unsaturated monomers, which are the basis for the evaluation of the Tg of a copolymer according to the Fox's equation, are described, for instance, in "Shin-Kobunshi Bunko (New Polymer Book), Vol. 7, Toryo-yo Goseijushi Njumon (Guide to Synthetic Resin for Paint)", Kyozo Kitaoka, published by Kobunshi Kanko-kai (Polymer Publishing Society), Kyoto, 1974, pp168–169, Table 10-2 (principal starting monomers for paint acrylic resins), and these numerical values can be adopted. All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

(9) Mode of Particles having a Core/Shell Structure Consisting of Layer A/Layer B:

In a mode of the particles according to the present invention, particles constituting the dispersed phase of an emulsion have a core/shell structure consisting of layer A/layer B. The calculated glass transition points of layer A and layer B are usually in the range of −50° C. to 100° C.

i) Layer A (core): It is substantially sufficient for layer A (core) to have a calculated glass transition point of 20° C. or below.

ii) Layer B (shell): It is sufficient for layer B (shell) to have a calculated glass transition point of 40° C. or above.

(10) Mode of Preparation of Particles having a Core/Shell Structure Consisting of Layer A/Layer B:

Particles of the above mode can be prepared, for example, as follows.

A liquid mixture of a core monomer for forming layer A is charged collectively or continuously dropwise, and is polymerized. Then, after the polymer of layer A has been obtained, a liquid mixture of a shell monomer for forming layer B is added thereto collectively or continuously dropwise, and is polymerized, thereby obtaining particles having a core/shell structure consisting of layer A/layer B. Here each monomer may be used in the form of an emulsion by mixing with pure water and a surfactant in advance.

(11) Preparation of Particles having a Core/Shell Structure:

No particular limitations are imposed on the method for preparing particles having a core/shell structure, so far as it is a means capable of realizing desired particle characteristics (layer structure, non-hollow structure, hollow structure, shape, particle size, particle size distribution, monomodality/polymodality, etc.). For example, a synthetic rubber emulsion is charged in advance into a pot, to which a vinylic monomer and a radical polymerization initiator are added to polymerize the monomer, that is an emulsion polymerization process. The particles may preferably be prepared by an emulsion polymerization process, but may also be prepared by a suspension polymerization process.

(12) Surfactant:

No particular limitation is imposed on the surfactant useful in the practice of the process for preparing an aqueous suspension of particles having a core/shell structure, so far as it forms a dispersed phase containing a monomer in an aqueous continuous phase substantially persistently and stably uniformly. Any known surfactants employed in common emulsion polymerization may preferably be used alone or as a mixture as the surfactant useful in the practice of the process for preparing an aqueous suspension of particles having a core/shell structure.

Mentioned hereunder are specific examples of nonionic surfactants, anionic surfactants and cationic surfactants, and these surfactants may preferably be used singly or in combination.

i) Anionic Surfactant:

Specific examples of the anionic surfactant include sodium dodecylbenzenesulfonate (DBS, SDS), sodium lauryl sulfate, sodium alkyldiphenyletherdisulfonate, sodium alkylnaphthalenesulfonate, sodium dialkylsulfosuccinate, sodium stearate, potassium oleate, sodium dioctylsulfosuccinate, sodium polyoxyethylenealkylethersulfate, sodium polyoxyethylenealkylphenylethersulfate, sodium dialkylsulfosuccinate, sodium oleate, sodium tertoctylphenoxyethoxypoly-(40)-ethoxyethylsulfate, etc. They can be used singly or as a mixture.

ii) Nonionic Surfactant:

Specific examples of the nonionic surfactant include polyoxyethylene lauryl ether, polyoxyethylene octylphenyl ether, polyoxyethylene oleylphenyl ether, polyoxyethylene nonylphenyl ether, oxyethylene-oxypropylene block copolymer, tert-octylphenoxyethylpoly-(39)-ethoxyethanol, nonylphenoxyethylpoly-(40)-ethoxyethanol, etc. They can be used singly or as a mixture.

iii) Cationic Surfactant:

Specific examples of the cationic surfactant include lauryltrimethylammonium chloride, stearyltrimethylammonium chloride, etc. They can be used singly or as a mixture.

(13) Amount of Surfactant used upon Polymerization of Seed Polymer:

No particular limitation is imposed on the amount of the surfactant used in the process for preparing an aqueous dispersion of particles having a core/shell structure, so far as the amount is substantially enough to form micelles in the reaction system or to form a dispersed phase containing a monomer in an aqueous continuous phase substantially persistently and stably uniformly. Generally, the kind and concentration of the surfactant are properly so selected as to substantially realizedesired particle characteristics (layer structure, hollow structure, shape, particle size, particle size distribution, monomodality/polymodality, etc.), taking the CMC (critical micelle concentration) and HLB (hydrophilic-lipophilic balance) values specific to the surfactant into consideration.

In an embodiment, the amount of the surfactant to be used is from 0.1 to 10% by weight based on the total weight of the whole monomer fed to the reaction system. If the amount of the surfactant is reduced to 0.1% by weight or less in such an embodiment, stability of the polymerization is lowered and a gel tends to be formed during polymerization. On the other hand, when the amount of the surfactant is increased to 10% by weight or more, water resistance of the film formed tends to be reduced. In another embodiment where a persulfate polymerization initiator is used, the surfactant may be used in an amount of 0 to 2.0% by weight based on the total weight of the whole monomer present in the reaction system.

(14) Amount of Surfactant used in Multistage Sequential Polymerization:

In an embodiment where a persulfate polymerization initiator is used, the amount of the surfactant used may be from 0 to 2.0% by weight based on the total weight of the whole monomer supplied to the first stage of polymerization. By carrying out emulsion polymerization while maintaining the amount of the surfactant at a low level, the most newly formed polymer can be deposited on the existing dispersed polymer particles formed in the preceding stage in the sequential stages of polymer formation. Here, "carrying out emulsion polymerization while maintaining the amount of the surfactant at a low level" generally means keeping the amount of the surfactant at a lower level than the amount corresponding to the CMC value in the reaction system at this stage. Such a conditional limitation that "carrying out emulsion polymerization while maintaining the amount of the surfactant at a low level" is commonly preferable and is for the purpose of obtaining a unimodal product. In a certain mode of reaction system, however, it is found to form dispersed micelles or particles that have favorable properties and are not in an excess number, even if a surfactant is used in an amount above that corresponding to the CMC value.

Such a conditional limitation that "carrying out emulsion polymerization while maintaining the amount of the surfactant at a low level" controls the number of micelles at each stage of the multistage sequential polymerization, with the result that the polymer formed at that stage is deposited on the particles or micelles formed in the previous stage.

(15) Polymerization Temperature:

No particular limitation is placed on the polymerization temperature employed in the process for preparing an aqueous dispersion of particles having a core/shell structure, so far as the polymerization reaction proceeds substantially sufficiently.

The polymerization temperature is determined in view of the kind of the monomer used, the kind of the polymerization initiator, etc. and is generally preferably in the range of about 10 to about 100° C., more preferably in the range of about 30 to about 90° C. Polymerization temperatures suitable for various polymerization initiators are described, for example, in "Kagaku Monograph (Chemical Monograph) Vol. 15, Chemistry of Polymer Synthesis", Takayuki Ohtsu, published by Kagaku Dojin (Chemical Associates), Kyoto, 1968, p63, Table 3-2 (classification of initiator), and these conditions may also be adopted favorably in the process for preparing an aqueous dispersion according to the present invention. All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

When a persulfate polymerization initiator is used, a temperature range of about 60 to about 90° C. is commonly preferred. When a redox polymerization initiator is used, generally, a temperature range of about 30 to about 70° C. is preferred, a temperature range of about 30 to about 60° C. is more preferred, and a temperature range of about 30 to about 45° C. is furthermore preferred.

(16) Kind of Polymerization Initiator:

Specific examples of the polymerization initiator useful in the practice of the process for preparing an aqueous dispersion of particles having a core/shell structure may embrace water-soluble free-radical initiators used commonly in emulsion polymerization, including hydrogen peroxide, tert-butyl peroxide, persulfates such as ammonium persulfate and alkali metal persulfates (metal: sodium, potassium and lithium), azo compounds such as azobisisobutyronitrile, organic peroxides such as cumene hydroperoxide and tert-butyl hydroperoxide. They may be used singly or as a mixture.

Other specific examples of the polymerization initiator may include redox polymerization initiators which form a redox system by using a reducing agent together with the polymerization initiator. The reducing agent may include sulfites such as alkali metal metabisulfites, alkali metal hydrosulfites and alkali metal hyposulfites, sodium formaldehyde sulfoxylate, sodium pyrosulfite, L-ascorbic acid, metallic ions such as iron ion, etc. They can be used alone or as a mixture.

In the process for preparing an aqueous dispersion of particles having a core/shell structure, it is also possible to preferably use, singly or as a mixture, polymerization initiators described, for example, in "Chemical Monograph Vol. 15, Chemistry of Polymer Synthesis", Takayuki Ohtsu, published by Chemical Associates, Kyoto, 1968, pp62–72 (initiator for radical polymerization). All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

(17) Amount of Polymerization Initiator Used:

No particular limitation is imposed on the amount of the polymerization initiator used in the process for preparing an aqueous dispersion of particles having a core/shell structure, so far as the amount is enough to assure a substantial rate of reaction. Generally, the amount of the polymerization initiator used is preferably in the range of 0.01 to 4 parts by weight based on 100 parts by weight of the total weight of the monomer supplied. Further, the amount of the reducing agent used in the redox system is also preferably in the range of 0.01 to 4 parts by weight based on 100 parts by weight of the total weight of the monomer supplied. The polymerization initiator may be added collectively or continuously.

(18) Molecular Weight of Polymer Formed in each Stage of Multistage Sequential Polymerization:

The weight average molecular weight of the polymer formed in each stage of the multistage sequential polymerization is generally from about 3,000,000 to about 100,000. When a chain transfer agent is used, it is generally about 100,000 or less. When crosslinking is formed in the course of polymerization, the molecular weight of the polymer can be increased noticeably. For example, in an embodiment where a relatively low weight average molecular weight is desired such as from about 500,000 to about 20,000, the amount of an ethylenic unsaturated monomer charged is controlled, and instead a chain transfer agent is employed in an amount of 0.05 to 2% or more.

(19) Chain Transfer Agent:

In the process for preparing an aqueous dispersion of particles having a core/shell structure, a chain transfer agent such as mercaptans may also be used as required. Illustrative examples of the chain transfer agent may include lower alkyl mercaptans such as sec-butyl mercaptan. They can be used singly or in combination.

(20) Particle Diameter:

No particular restrictions are placed on the average diameter of the particles having a core/shell structure, so far as the system of the composition is substantially sequentially stable and uniform and their storage stability and workability are substantially sufficiently assured.

Specially, from a viewpoint of improving impact resistance and chipping resistance, the diameter of a primary particle of the particles (C) is preferably 0.01 to 5 μm, and more preferably 0.01 to 1.5 μm when appearance of the paint film and particularly its smoothness are also taken into account. Here, the primary particle signifies a minimum particle unit having a core/shell structure. Thus, in considering industrial production, an emulsion polymerization process is conceivably most advantageous from the standpoint of particle diameter control and grinding cost. The particle diameter can be evaluated by means of a Coulter counter N4 (manufactured by Coulter Co.).

(21) Weight Ratio of Core Polymer/Shell Polymer:

No particular limitation is imposed on the weight ratio of core polymer/shell polymer in the core/shell particles, so far as the ratio can substantially assure a desired core/shell structure.

The weight ratio of core polymer/shell polymer in the core/shell particle according to the present invention is preferably from 5/95 to 90/10 in general. As the weight ratio is deviated from the above preferred value range, the degree of crosslinking formation between core and shell is reduced and the crosslinking density of the film upon film formation is also decreased. Further, there is such a tendency that performances (solvent resistance, water resistance etc.) of the film are also degraded.

(22) Additive:

An additive used in a common polymer emulsion composition can be added as needed to the particles having a core/shell structure. Specific examples of the additive may include, for example, antifoaming agent, dispersant, thickening agent, pigment, pigment dispersant, bath agent, film-forming assistant, organic solvent, plasticizer, antiseptic agent, bactericide, rust preventive, thixotropic agent (additive for controlling thixotropy), etc. They can be used singly or in combination.

[Mode of Particles having a Core/shell Structure]

The core component and shell component constituting the particle (C) having a core/shell structure are respective components for constituting a polymeric body having a form of a so-called core/shell structure, the core component being named to designate a component for forming the inner part, while the shell component is the name for a component for forming the outer part. The particle is generally a graft copolymer.

The core of the particle (C) is generally obtained by polymerization in a reaction system containing an ethylenic unsaturated monomer having at least one double bond in the molecule while the shell is obtained by polymerization in a reaction system containing the same or different ethylenic unsaturated monomer having at least one double bond in the molecule. The particle (C) is preferably composed of a graft copolymer comprising (i) a synthetic rubber formed by polymerizing a diene monomer and/or unsaturated monomer as the core component and (ii) a vinylic polymer as the shell component.

(1) Mode of Core:

Specific examples of the diene monomer which is a raw material for the synthetic rubber constituting the core component, may embrace butadiene, isoprene and the like.

The unsaturated monomer may include (1) alkyl acrylates such as 2-ethylhexyl acrylate, butyl acrylate, ethyl acrylate and methyl acrylate; and/or alkyl methacrylates such as methyl methacrylate and n-butyl methacrylate, (2) vinyl esters such as vinyl acetate, (3) vinyl halides and/or vinylidene halides such as vinyl chloride and vinylidene chloride, (4) unsaturated monomers such as acrylonitrile and acrylamide, (5) hydroxylic unsaturated monomers such as hydroxyethyl acrylate, hydroxy methacrylate, methylol acrylamide and methylol methacrylamide, (6) carboxylic unsaturated monomers such as acrylic acid, methacrylic acid, maleic anhydride and itaconic acid, (7) aromatic unsaturated monomers such as styrene, α-methylstyrene and vinyltoluene. For the purpose of crosslinking, (8) halogenated monomers such as 2-chloroethyl vinyl ether and (9) glycidylic unsaturated monomers such as glycidyl acrylate and allyl glycidyl ether may be used. These unsaturated monomers can be used alone or in combination.

Specific examples of the synthetic rubber obtained therefrom may include, for example, polybutadiene, polyisoprene, polyacrylate rubber, polyvinyl chloride, styrene-butadiene copolymer, styrene-butadiene-styrene block copolymer, styrene-isoprene-styrene copolymer, styrene-ethylene/butylene-styrene copolymer, and the like. Among these, polybutadiene, polyisoprene, styrene-butadiene copolymer and polyacrylate rubber are preferred.

The glass transition point of the core or the synthetic rubber is 20° C. or below. A glass transition point of 0° C. or below is more preferred. When the glass transition point is above 20° C., there is a tendency that sufficient improvement effects are not obtained in both impact resistance and chipping resistance of the paint film. The glass transition point of the core or the synthetic rubber can be either measured by means of a differential scanning calorimeter (DSC) or calculated by the Fox's equation.

(2) Mode of Shell:

The vinylic polymer which is the shell component, is a polymer formed by polymerizing one kind or more of vinylic monomers.

Specific examples of the vinylic monomer may include, for example, (1) alkyl acrylates such as 2-ethylhexyl acrylate, butyl acrylate, ethyl acrylate and methyl acrylate; and/or alkyl methacrylates such as methyl methacrylate and n-butyl methacrylate, (2) vinyl esters such as vinyl acetate, (3) vinyl halides and/or vinylidene halides such as vinyl chloride and vinylidene chloride, (4) unsaturated monomers such as acrylonitrile and acrylamide, (5) hydroxylic unsaturated monomers such as hydroxyethyl acrylate, hydroxy methacrylate, methylol acrylamide and methylol methacrylamide, (6) carboxylic unsaturated monomers such as acrylic acid, methacrylic acid, maleic anhydride and itaconic acid, (7) aromatic unsaturated monomers such as styrene, α-methylstyrene and vinyltoluene. They can be used alone or in combination.

Among these, particularly preferred polymer is a homopolymer or a copolymer formed from (1) alkyl acrylates and alkyl methacrylates and/or (7) aromatic unsaturated monomers. When glycidylic unsaturated monomers are used, the interfacial adhesion between the (meth)acrylic copolymer (A) (that is the matrix resin) and the shell is increased beyond necessity to impair the smoothness of the paint film obtained, thus raising a problem in appearance.

The glass transition point of the shell or the vinylic polymer should be 40° C. or above in view of the workability of the particles (C) having a core/shell structure in the drying step after synthesis and the compatibility with or dispersibility in the acrylic and/or methacrylic copolymer (A). The glass transition point of the shell or the vinylic polymer can be either measured by means of a differential scanning calorimeter (DSC) or calculated by the Fox's equation.

The concept of the term "compatibility" used in the claims or the specification of the present application, for example, includes (i) the concept of "compatibility" described in "Shinpan Kobunshi Jiten (Polymer Dictionary, New Edition)", edited by Kobunshi Gakkai (Polymer Society), published by Asakura Shoten (Asakura Bookstore), Tokyo, 1988, left column on p437 to right column on p438 (polymer blend), (ii) that multiphase polymers are compatible or highly compatible, and (iii) if a multiphase polymer is non-compatible or poorly compatible, a "compatibilizer" is added to the multiphase polymer in a small amount as a third component to improve the compatibility. All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

When a multiphase polymer is compatible or highly compatible, remarkable improvements are commonly exhibited in material properties.

The concept of the term "compatibilizer" used in the claims or the specification of the present application include the concept of "compatibilizer" described in "Polymer Alloy -Basis and Application-", edited by Polymer Society, published by Tokyo Chemical Associates, Tokyo, 1981)". All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

[Functional Division of Core and Shell]

Functional division of the core and the shell is assumed to be such that the core with a high modulus of elasticity controls impact-absorbing capacity while the shell with a low modulus of elasticity dominates dispersibility in, compatibility with and adhesiveness to the matrix resin. The definite principle of impact absorption is mentioned in a report by Kawai et al. (Journal of Macromolecular Science Physics, Vol. 17, pp427- (1980), a report by Matsuo et al. [Polymer Engineering Science 9, pp197- (1969)], etc. Namely, the principle is illustrated in a rapture mechanism wherein stress concentration is caused at the interface of the rubber phase by the difference of elastic modulus and hence a microcraze is formed in the direction perpendicular to the load direction from the interface toward the matrix resin in a polymer having a microphase separated structure.

[Illustrative Example of Commercially Available Product of Particles (C) having a Core/Shell Structure]

Some impact modifiers already available on the market can be used as the particles (C) having a core/shell structure. These modifiers have been confirmed to have an equivalent effect to those particles synthesized by the present inventors.

Illustrative examples thereof may include, for example, "PARALOID KM 330" and "PARALOID EXL 2315" made by Kureha Chemical Industry Co., Ltd. and "KANEACE FM" made by Kanegafuchi Chemical Industry Co., Ltd. wherein the synthetic rubber is of a polyacrylate, "BTA-III N2" and "BTA 712" made by Kureha Chemical Industry Co., Ltd. wherein the synthetic rubber is of a styrene-butadiene copolymer, and "PARALOID EXL 2602", "BTA 751" and "BTA-III NX" made by Kureha Chemical Industry Co., Ltd. wherein the synthetic rubber is of a polybutadiene.

[Solubility Parameter]

In the present invention, the particles (C) having a core/shell structure which constitute a dispersed phase (islands) can realize an uniform multiphase polymer system by selecting a monomer whose polymer has a solubility parameter (SP value) near that of an acrylic or methacrylic resin constituting a continuous phase (ocean) as monomer units in the molecule of a shell (particle surface) polymer or by introducing a suitable compatibilizer as a third component, without introducing epoxy or glycidyl group entirely or at a high density into the surface of the particles.

[Amount of Particles (C) having a Core/Shell Structure]

It is suitable to use the particles (C) having a core/shell structure in an amount of 2 to 50 parts by weight, preferably 5 to 30 parts by weight based on 100 parts by weight of the total weight of the acrylic and/or methacrylic copolymer (A) and the polybasic carboxylic compound (B) from the viewpoint of the degradation of impact resistance, hardness and heat resistance. If the amount is less than 2 parts by weight, improvement effect is insufficient in impact resistance, while any amount in excess of 50 parts by weight significantly deteriorates hardness, heat resistance and appearance of the paint film.

[Additive]

The thermosetting powder paint composition of the present invention may be blended with various resins including synthetic resins such as epoxy resins, polyester resins and polyamide resins or cellulose derivatives to the extent that the object of the present invention is not thereby spoiled. In addition, the composition may also be blended with paint additives commonly used, such as pigments, flowability controlling agents, antiblocking agents, ultraviolet light absorbers, benzoin, antistatic agents and antioxidants. When used as a clear coat, the composition may be blended with a small amount of a pigment to color it to the extent that the opacifying effect of the pigment is not completely exhibited.

[Melt Kneading Apparatus]

The melt kneading apparatus to be used may commonly include heating rollers, heating kneaders, extruders and the like. As a specific method for blending the thermosetting powder paint composition of the present invention, the composing elements of the composition are mixed fully uniformly by properly using in combination kneaders and mill mixers such as roller mills, kneaders, mixers (Banbury type, transfer type, etc.), calender equipment and extruders and by properly setting the conditions (temperature, melting or non melting, revolution, vacuum atmosphere, inert gas atmosphere, etc.) of each step. Then, the mixture is ground by a grinding apparatus to obtain a powder paint composition in a uniform, fine-powdered state. However, the blending method is not limited thereto or thereby.

[Preparation of Powder Paint Composition]

To prepare a powder paint, any known methods can be employed and kneaders including heating rollers, extruders, etc. are generally used for the mixing.

No particular limitation is imposed on the temperature of the elements being kneaded upon kneading mechanically the composition comprising (A), (B) and (C), so far as a substantially uniform powder paint composition can be prepared.

However, in the present invention, when the particles (C) having a core/shell structure are not dispersed uniformly but localized in the acrylic and/or methacrylic copolymer (A), and sufficient impact absorbing effects cannot be obtained occasionally. Particularly, when the particles (C) having a core/shell structure are prepared through polymerization in an aqueous solution followed by drying of the resultant polymeric body, primary particles sometimes coagulate during the drying to form agglomerates (secondary particles) of about 100 $\mu$m size. In such a case, it becomes necessary to disintegrate the secondary particles into primary particles in the course of preparation (kneading) of the powder paint. Then, to help the disintegration, it is effective to raise the kneading temperature and knead the composition while softening at least one element of either the acrylic and/or methacrylic copolymer (A) or the polybasic carboxylic compound (B).

Then specifically, the temperature of the elements being mechanically kneaded is preferably equal to or above the lowest temperature of either the near glass transition point of the acrylic and/or methacrylic copolymer (A) or the melting temperature of the polybasic carboxylic compound (B). When the composition comprising (A), (B) and (C) is mechanically kneaded, the temperature of the composition is regulated to a higher temperature than the lower temperature of either (i) a temperature lower by 30° C. than the glass transition point of the acrylic and/or methacrylic copolymer (A) or (ii) the melting temperature of the polybasic carboxylic compound (B). When the composition is kneaded at a temperature lower than both the near glass transition point of the acrylic and/or methacrylic copolymer (A) and the melting temperature of the polybasic carboxylic compound (B), that is derivating from the above temperature conditions, secondary particles of the particles (C) having a core/shell structure remain so that an excessively large kneading energy is disadvantageously required to obtain a sufficient impact resistance and chipping resistance of the paint film.

With the above points in view, the following methods may be employed as specific kneading methods capable of dispersing efficiently the particles (C) having a core/shell structure.

(1) An acrylic and/or methacrylic copolymer (A), a polybasic carboxylic compound (B) and particles (C) having a core/shell structure are kneaded simultaneously in a given kneading temperature range.

(2) Only an acrylic and/or methacrylic copolymer (A) and particles (C) having a core/shell structure are kneaded in advance in a given kneading temperature range. Then, the kneaded product is further kneaded with a polybasic carboxylic compound (B) in the same temperature range.

(3) Particles (C) having a core/shell structure are dispersed uniformly in an organic solvent solution of an acrylic and/or methacrylic copolymer (A) and the solvent is removed from the mixed solution (or slurry), thereby obtaining a mixture of only the acrylic and/or methacrylic copolymer (A) and the particles (C) having a core/shell structure in advance (here, xylene, toluene, etc. can be used as the organic solvent). The mixture is further kneaded with a polybasic carboxylic compound (B) in a given temperature range.

Particularly, in the method (3), the acrylic and/or methacrylic copolymer (A) may be prepared by a solution polymerization process in an organic solvent such as xylene, toluene, etc., and then the particles (C) having a core/shell structure may be dispersed therein during the period from the end of polymerization to the initiation of solvent removal. Thus, the method can be simplified.

With a view to accelerating uniform dispersion in a kneader, it is effective to mix all the elements to be kneaded mechanically in advance at room temperature. A Henschel mixer and the like may be used for this purpose.

It is possible to determine whether or not the particles (C) having a core/shell structure are dispersed uniformly in the state of primary particles in the mass of a bulk paint prepared in the kneading step, by means of an optical microscope, scanning electron microscope, transmission electron microscope, Coulter counter and the like.

The bulk paint obtained by the kneading is cooled and ground to particles of an average diameter of about 10 to 90 μm. The grinding machine used may include a hammer mill and the like.

One mode of a mixing and kneading step wherein additives are added to the powder paint composition of the present invention is illustrated as follows: Additives such as an antiblocking agent, surface controlling agent, plasticizer, electrification controlling agent, pigment, filler and extender are added as needed to the thermosetting powder paint composition of the present invention. The mixture is melted and kneaded fully at a temperature in the range of 40 to 130° C., cooled and then ground uniformly to a suitable particle size (usually 100 mesh or below).

[Coating Method and Baking Method]

The powder paint obtained by the grinding is deposited on an object by a coating method including electrostatic coating, fluidization dip coating, etc., and cured by heating to form a paint film.

Baking of the thermosetting powder paint composition of the present invention can be effected commonly at a temperature of about 100° C. to about 150° C., more preferably about 120° C. to about 140° C. commonly for about 10 to about 60 minutes, thereby crosslinking the copolymer (A) and the curing agent (B). After the baking, the resultant paint composition is cooled to a room temperature to obtain a paint film having excellent characteristics.

The paint film comprises, as a dispersed phase, particles having a core/shell structure each comprising a core having a calculated glass transition point of 20° C. or below, the core being covered at least partially with at least one shell of a calculated glass transition point of 40° C. or above; and, as a continuous phase, an organic polymer having a three dimensional crosslinked network structure and/or IPN structure; said dispersed phase being held uniformly in the continuous phase by the three dimensional crosslinked network structure and/or IPN structure of said continuous phase.

The paint film usually exhibits the impact resistance and chipping resistance of the whole paint film based on the impact resistance of the dispersed phase owing to the dispersed phase being held uniformly in the continuous phase by the three dimensional crosslinked network structure and/or IPN structure of said continuous phase.

In the specification of the present application, the following examples, preparation examples and modes are only for the purpose of supporting the understanding of the contents of the invention according to the present application, and accordingly the present invention shall never be limited by the descriptions.

The present invention will be illustrated more specifically by reference to the following examples and comparative examples. In the illustrations, "part(S)" and "%" are by weight, unless otherwise stated.

[Preparation of Coating Plate]

A polyester-melamine crosslinked black paint was applied on a satin steel plate of 0.8 mm thick treated with zinc phosphate to a thickness of 30 μm. The resulting plate was baked to prepare a surface treated steel plate.

[Performance Evaluation]

Performance evaluation was made as follows.

(1) Impact Resistance Test (Du Pont impact test):

The test was conducted according to JIS K5400 6. 13. 3. The weights employed herein weighed 500 g and 1 kg. The numerical value of the evaluation result was shown by a drop height at which cracking and scaling was caused in the paint film.

(2) Chipping Test (scattering stone impact test):

A gravellometer (made by Suga Testing Machine Co., Ltd.) was used according to SAE-J400 and ASTM D-370, a testing method for paint films for automobiles in the United States.

A coating steel plate was placed in a refrigerator of −20° C. for 4 hours and then immediately cooled in a dry ice/methanol bath of −30° C. for 5 minutes. The resultant coating steel plate was taken up from the dry ice/methanol bath and set in the gravellometer where crushed stones were immediately blasted to the plate to conduct a chipping test.

The time required from taking up from the dry ice/methanol bath to blasting crushed stones was set within 5 seconds. Crushed stones No. 7 for road specified in JIS A-5001 were used as the crushed stones. Fifty grams of the crushed stones were used for each coating steel plate and caused to hit at a stretch. The pressure of a compressed air used for the blasting was set at 4 kgf/cm$^2$ (gauge). The steel plate flawed due to the collision with the crushed stones was left to stand at room temperature for 10 minutes and paint films being nearly peeled were removed completely by using a masking tape.

The chipping resistance was expressed by the average diameter of the flaws. Thus, the smaller the diameter of the flaw, the better is the chipping resistance.

(3) Weather Resistance Test:

A 1,000-hr accelerated test was conducted by means of a QUV tester to measure the glossiness of the paint film before and after the accelerated test, thereby determining the residual rate of glossiness (%). The residual rate of glossiness is calculated by the following equation.

$$\text{Residual rate of glossiness (\%)} = \frac{60^\circ \text{ glossiness after accelerated test}}{60^\circ \text{ glossiness before accelerated test}} \times 100$$

(4) Acid Resistance Test:

A 10 vol. % sulfuric acid was dropped on the surface of the paint film, and then it was left to stand at room temperature for one day. Then, the sulfuric acid was wiped and the appearance of the film was observed. From the observation, a paint film with no trace was evaluated as ○, while one with traces was shown as X.

(5) Visual Appearance:

From the observation of the appearance of the paint film, a paint film with particularly excellent smoothness was evaluated as ◎, one with good smoothness as ○, one with average smoothness as Δ, and one with inferior smoothness as X.

(6) Solvent Resistance:

The surface of the paint film was rubbed with a gauze impregnated with xylol 50 roundtrips and then the film was observed. From the observation, a paint film with no trace was evaluated as ○, while one with traces was shown as X.

(7) Film Hardness Test:

The test was conducted by the pencil scratch test (according to JIS K5400 6. 14). The result was expressed in terms of a hard number of pencil.

PREPARATION EXAMPLES 1 and 2 (Preparation of acrylic copolymers)

Into a four neck flask equipped with a stirrer, thermometer, reflux condenser and nitrogen inlet pipe were charged 66.7 parts of xylene, and then heated to the reflux temperature. Monomers shown in Table 1 (parts) and a polymerization initiator of N,N'-azobisisobutyronitrile were added thereto dropwise over 5 hours and the mixture was maintained at 100° C. for 5 hours. By removing the solvent from the polymerization solution thus obtained, acrylic copolymers (Preparation Examples 1 and 2) were obtained. Characteristic values of the copolymers obtained are given in Table 1.

TABLE 1

Preparation Examples 1 and 2: (Preparation of acrylic copolymer)

| | | Preparation Example 1 | Preparation Example 2 |
|---|---|---|---|
| a1 | Glycidyl methacrylate | 21.0 | 28.5 |
| a2 | Styrene | 35.0 | 15.0 |
| | Methyl methacrylate | 35.4 | 34.0 |
| | N-butyl methacrylate | — | 22.5 |
| | 2-Ethyl hexylacrylate | 8.6 | — |
| | Epoxy equivalent (g/eq) | 725 | 535 |
| | Glass transition temp. (° C.) | 70 | 65 |
| | Number average molecular weight (Mn) | 3,000 | 3,500 |

PREPARATION EXAMPLE 3 (Preparation of particles)

First, a polyacrylate rubber as the core component was prepared in the following manner. Into a flask were charged 44.2 parts of water, 0.1 part of a surfactant (trade mark: Pelex SS-L, made by Kao, Corp.) and 0.2 part of a polymerization initiator of potassium persulfate. The temperature of the contents was maintained at 75° C. in a stream of nitrogen. Then, an emulsion prepared in advance from 22.5 parts of butyl acrylate, 15.8 parts of acrylonitrile, 1.2 parts of methacrylic acid, 0.3 part of a surfactant (Pelex SS-L) and 15.7 parts of water was added continuously dropwise over 4 hours into the flask kept at 75° C. in a stream of nitrogen. The remaining monomers were polymerized for consecutive 3 hours and the reaction solution was cooled to room temperature. The polyacrylate rubber thus formed had a solid content of 40% and a viscosity of 22 cPs.

Next, a graft copolymer particles were prepared by reacting the rubber with shell components in the following manner. Into a flask were charged 40.0 parts of the above obtained latex of polyacrylate rubber, 30.0 parts of water and 0.2 part of a polymerization initiator of potassium persulfate, and the temperature was kept at 75° C. in a stream of nitrogen. Then, an emulsion prepared in advance from 9.2 parts of methyl methacrylate, 5.4 parts of styrene, 0.4 part of acrylic acid and 0.3 part of a surfactant (Pelex SS-L) and 14.5 parts of water was added continuously dropwise over 6 hours into the flask kept at 75° C. in a stream of nitrogen to conduct the reaction. The remaining monomers were polymerized for consecutive 2 hours, and the reaction solution was cooled to room temperature. The graft copolymer latex so formed was subjected to coagulation, precipitation and filtration, and the solid component obtained was dried to evaporate water and pulverized.

The particles of Preparation Example 3 to be used in Examples 1, 2, 3 and 6 had an observed average particle diameter of 0.3 $\mu$m, the cores thereof had a calculated glass transition point of −5° C., and the shells thereof had a calculated glass transition point of 106° C.

PREPARATION EXAMPLE 4 (Preparation of particles)

First, a polyacrylate rubber as the core component was prepared in the following manner. Into a flask were charged 41.4 parts of water, 0.1 part of a surfactant (Pelex SS-L) and 0.2 part of a polymerization initiator of potassium persulfate. The temperature of the contents was maintained at 75° C. in a stream of nitrogen. Then, an emulsion prepared in advance from 35.8 parts of butyl acrylate, 4.5 parts of acrylonitrile, 2.0 parts of methacrylic acid, 0.3 part of a surfactant (Pelex SS-L) and 15.7 parts of water was added continuously dropwise over 4 hours into the flask kept at 75° C. in a stream of nitrogen to conduct the reaction. The remaining monomers were polymerized for consecutive 3 hours and the reaction solution was cooled to room temperature. The polyacrylate rubber so formed had a solid content of 43% and a viscosity of 25 cPs.

Next, a graft copolymer particles were prepared by reacting the rubber with shell components in the following manner. Into a flask were charged 40.6 parts of the above obtained latex of polyacrylate rubber, 34.2 parts of water and 0.2 part of potassium persulfate as a polymerization initiator, and the temperature was kept at 75° C. in a stream of nitrogen. Then, an emulsion prepared in advance from 5.4 parts of methyl methacrylate, 3.4 parts of isobutyl acrylate, 1.0 parts of glycidyl methacrylate, 0.2 part of a surfactant (Pelex SS-L) and 15.0 parts of water was added continuously dropwise over 6 hours into the flask kept at 75° C. in a stream of nitrogen. The remaining monomers were polymerized for consecutive 2 hours, and the reaction solution was cooled to room temperature. The graft copolymer latex so formed was subjected to coagulation, precipitation and filtration, and the solid component obtained was dried to evaporate water and pulverized.

The particles of Preparation Example 4 to be used in Compartive Example 6 had an observed average particle diameter of 0.4 μm, the cores thereof had a calculated glass transition point of −39° C., and the shells thereof had a calculated glass transition point of 41° C. The glycidyl methacrylate which was a polymerizable monomer having a reactive group for constituting the shell, had been used in an amount of 5.7 parts based on 100 parts of the core by calculation.

EXAMPLES 1 and 2

Each acrylic copolymer (Preparation Examples 1 and 2), dodecandioic acid, the particles (Preparation Example 3) and titanium oxide were blended in the proportions given in Table 2. The mixture was melted and kneaded by a heating roller at 90° C., cooled, and pulverized by a grinder. Portions having passed through a 150-mesh sieve were collected to obtain a powder paint.

The powder paint obtained was applied on a phosphated steel plate by an electrostatic spray to a film thickness of 60 to 70 μm and then heated at 130° C. for 30 minutes to obtain a test plate.

EXAMPLE 3

A test plate was obtained in entirely the same manner as in Example 1 except that no titanium oxide was used in Example 1.

EXAMPLES 4 and 5

In Example 4, a test plate was obtained in exactly the same manner as in Example 1 except that a commercially available impact modifier, PALALOID EXL2315 (manufactured by Kureha Chemical Industry Co., Ltd.), was used as the particles. In Example 5, a test plate was obtained in exactly the same manner as in Example 1 except that a commercially available impact modifier, PALALOID EXL2602 (manufactured by Kureha Chemical Industry Co., Ltd.), was used similarly.

The blending proportion was the same as that of Example 1 and given in Table 2. The commercially available products used herein are manufactured by Kureha Chemical Industry Co., Ltd. and both had a shell made of a polymethyl methacrylate homopolymer. The core was made of a crosslinked acrylic rubber composed primarily of n-butyl acrylate in EXL2315, while it was made of a styrenebutadiene copolymer in EXL2602. Both the products corresponded to the particles having a core/shell structure of the present invention.

The particles EXL2315 used in Example 4 had an average particle diameter of 0.4 μm, the cores thereof had a glass transition point of −34° C. (only the diameter was actually measured), and the shells thereof had a calculated glass transition point of 85° C. The particles EXL2602 used in Example 5 had an average particle diameter of 0.2 μm, the cores thereof had a glass transition temperature of −73° C. (both were actually measured), and the shells thereof had a calculated glass transition point of 41° C., and the shells thereof had a calculated glass transition point of 90° C.

EXAMPLES 6 and 7

In Example 6, a test plate was obtained in exactly the same manner as in Example 1 except that dodecandioic acid anhydride (HO—$[OC(CH_2)_{10}COO]_3$—H) having an anhydride group was used as the polybasic carboxylic acid. In Example 7, a test plate was obtained in exactly the same manner as in Example 4 except that the dodecandioic acid anhydride was used similarly. The blending proportions of the elements are shown in Table 2.

COMPARATIVE EXAMPLE 1

Blended were 74.1 parts of a main agent (trade mark: ER-8105, manufactured by Unitika, Ltd.) of a polyester-base powder paint, 5.9 parts of a curing agent of triglycidyl isocyanurate and 20.0 parts of titanium oxide. A powder paint was prepared from the blend in the same manner as in Example 1. A phosphated plate was coated with the powder paint by an electrostatic spray to a film thickness of 60 to 70 μm and heated at 200° C. for 20 minutes to obtain a test plate.

COMPARATIVE EXAMPLE 2

A test plate was obtained in entirely the same manner as in Example 1 except that no particles were used in Example 1.

COMPARATIVE EXAMPLE 3

A test plate was obtained in entirely the same manner as in Example 7 except that no particles were used in Example 7.

COMPARATIVE EXAMPLES 4 and 5

In Comparative Example 4, a test plate was obtained in accordance with Example 1 of Japanese Patent Publication No. 25709/1987. That is, the polymerizable epoxy compound modified (10%) by acrylic acid was prepared from bisphenol A type epoxy resin (Epycoat 828 manufactured by Shell Petrochemical Co., Ltd.: epoxy equivalent=190). Then, the epoxy/acryl-modified rubber particles (core/shell particles) were prepared from polybutadiene rubber latex, the polymerizable epoxy compound and acrylic monomers. The particles had epoxy groups on the surface.

Then, the epoxy-modified rubber particles, epoxy resin (Epycoat 1004 manufactured by Shell Petrochemical Co., Ltd.: epoxy equivalent=950), dicyandiamide as a curing agent and flowability controlling agent (Modaflow manufactured by Monsanto Co., Ltd.) were blended in the proportions given in Table 3, and then the plate coated with the paint was heated at 170° C. for 20 minutes.

In Comparative Example 5, a test plate was obtained in the same manner as in Comparative Example 4, except that there are used Amicure PN-23 (manufactured by Ajinomoto Co., Inc.) as a curing accelerator and titanium oxide as a inorganic pigment in the proportion shown in Table 3.

COMPARATIVE EXAMPLE 6

A test plate was obtained in entirely the same manner as in Example 7 except that the particles prepared in Preparation Example 4 were used in Example 7, in the proportion shown in Table 4.

The results of performance evaluation of the paint films formed in Examples 1 to 7 and Comparative Examples 1 to 6 are illustrated in Table 5. As seen from the results of Examples 1 to 7 given in Table 5, the paint films of the present invention show equivalent or higher impact resistances than those of polyester-based paints without impairing the weather resistance of acrylic powder paints. Since no problems are raised in acid resistance test, visual appearance and other points, the powder paint composition of the present invention also has practical common properties as a paint.

TABLE 2

Components in Examples 1 to 6:

| | (A) (Meth)acrylic copolymer | (B) Polybasic carboxylic compound | (C) Core/shell particles | Titanium oxide |
|---|---|---|---|---|
| Ex. 1 | Preparation Example 1 51.8 | Dodecandioic acid 8.2 | Preparation Example 3 20.0 | 20.0 |
| Ex. 2 | Preparation Example 2 57.6 | Dodecandioic acid 12.4 | Preparation Example 3 10.0 | 20.0 |
| Ex. 3 | Preparation Example 1 64.8 | Dodecandioic acid 10.2 | Preparation Example 3 25.0 | 0 |

TABLE 2-continued

Components in Examples 1 to 6:

| | (A) (Meth)acrylic copolymer | (B) Polybasic carboxylic compound | (C) Core/shell particles | Titanium oxide |
|---|---|---|---|---|
| Ex. 4 | Preparation Example 1 51.8 | Dodecandioic acid 8.2 | EXL 2315 20.0 | 20.0 |
| Ex. 5 | Preparation Example 1 51.8 | Dodecandioic acid 8.2 | EXL 2602 20.0 | 20.0 |
| Ex. 6 | Preparation Example 2 46.1 | Dodecandioic acid anhydride 13.9 | Preparation Example 3 20.0 | 20.0 |
| Ex. 7 | Preparation Example 2 46.1 | Dodecandioic acid anhydride 13.9 | EXL 2315 20.0 | 20.0 |

TABLE 3

Components in Comparative Examples 4 and 5:

| | Resin component | Curing agent | Flowability controlling agent | Curing accelerator | Core/shell particle | Titanium oxide |
|---|---|---|---|---|---|---|
| Co. Ex. 4 | Epycoat-1004 71.9 | Dicyane diamide 3.6 | Modaflow 0.5 | 0 | Epoxy-modified 24.0 | 0 |
| Co. Ex. 5 | Epycoat-1004 56.3 | Dicyane diamide 2.8 | Modaflow 0.3 | Amicure PN-23 0.6 | Epoxy-modified 20.0 | 20.0 |

TABLE 4

Components in Comparative Example 6:

| | (Meth)acrylic copolymer | compound | Core/shell paritcles | Titanium oxide |
|---|---|---|---|---|
| Co. Ex. 6 | Preparation Example 2 46.1 | Dodecandioic acid anhydride 13.9 | Preparation Example 4 20.0 | 20.0 |

TABLE 5

Evaluation:

| | | | Ex. 1 | Ex. 2 | Ex. 3 | Ex. 4 | Ex. 5 | Ex. 6 | Ex. 7 | Co. Ex. 1 | Co. Ex. 2 | Co. Ex. 3 | Co. Ex. 4 | Co. Ex. 5 | Co. Ex. 6 |
|---|---|---|---|---|---|---|---|---|---|---|---|---|---|---|---|
| Impact resistance test | Du Pont impact test (cm) | 500 g | 50 or more | 50 or more | 50 or more | 50 or more | 50 or more | 50 or more | 50 or more | 50 or more | 30 | 25 | 45 | 50 or more | 50 or more |
| | | 1 Kg | 50 or more | 50 | 50 | 50 or more | 50 or more | 45 | 50 | 45 | 15 | 15 | 15 | 50 | 50 |
| | Scattering stone impact test (mmφ) | | 1.4 | 1.2 | 1.7 | 1.3 | 1.2 | 0.8 | 0.9 | 1.7 | 3.2 | 2.7 | 2.8 | 2.1 | 2.0 |
| Weather resistance test residual rate (%) | | | 92 | 94 | 92 | 93 | 91 | 90 | 91 | 64 | 94 | 90 | 40 | 48 | 93 |
| Acid resistance test | | | ○ | ○ | ○ | ○ | ○ | ○ | ○ | × | ○ | ○ | ○ | ○ | ○ |
| Visual appearance | | | ◎ | ◎ | ◎ | ◎ | ◎ | ◎ | ◎ | ◎ | ◎ | ◎ | ○ | ○ | × |
| Solvent resistance | | | ○ | ○ | ○ | ○ | ○ | ○ | ○ | ○ | ○ | ○ | ◎ | ◎ | ◎ |
| Film hardness | | | H | H | H | H | H | H | H | H | 2H | 2H | H | H | H |

What is claimed is:

1. A thermosetting (meth)acrylic powder paint consisting essentially of:

at least one acrylic and/or methacrylic copolymer (A) having a number average molecular weight of 3,500 or less which is obtained by polymerization in a reaction system containing an ethylenic unsaturated monomer having at least one glycidyl group and at least one unsaturated double bond in the molecule as a monomer (a1) and an ethylenic unsaturated monomer having at least one unsaturated double bond and no glycidyl group in the molecule as a monomer (a2);

at least one polybasic carboxylic compound (B) selected from the group consisting of polybasic carboxylic acids (b1) and polybasic carboxylic anhydrides (b2);

particles (C) having a core/shell structure each comprising a core consisting of a synthetic rubber having a calculated glass transition point of 20° C. or below, the core being covered at least partially with at least one shell having a calculated glass transition point of 40° C. or above, and said shell substantially having neither epoxy group nor glycidyl group; and additives of a powder paint.

2. The thermosetting (meth)acrylic powder paint according to claim 1, wherein the core of particle (C) is obtained by polymerization in a reaction system containing an ethylenic unsaturated monomer having at least one double bond in the molecule while the shell is obtained by polymerization in a reaction system containing the same or different ethylenic unsaturated monomer having at least one double bond in the molecule and said monomer substantially having neither epoxy group nor glycidyl group.

3. The thermosetting (meth)acrylic powder paint according to claim 1, wherein the acrylic and/or methacrylic copolymer (A) has a calculated glass transition point of 20 to 120° C.

4. The thermosetting (meth)acrylic powder paint according to claim 1, wherein the acrylic and/or methacrylic copolymer (A) has a number average molecular weight of 1,000 to 3,500.

5. The thermosetting (meth)acrylic powder paint according to claim 1, wherein the acrylic and/or methacrylic copolymer (A) has an epoxy equivalent of 200 to 1,000 g/eq.

6. The thermosetting (meth)acrylic powder paint according to claim 1, wherein the polybasic carboxylic acid (b1) is an aliphatic polybasic carboxylic acid.

7. The thermosetting (meth)acrylic powder paint according to claim 1, wherein the polybasic carboxylic anhydride (b2) is an aliphatic polybasic carboxylic linear acid anhydride.

8. The thermosetting (meth)acrylic powder paint according to claim 7, wherein the aliphatic polybasic carboxylic linear acid anhydride is represented by the following general formula:

$$HO-[OC(CH_2)_mCOO]_n-H$$

wherein m is 1 or more, n is 2 or more.

9. The thermosetting (meth)acrylic powder paint according to claim 7, wherein the aliphatic polybasic carboxylic linear acid anhydride is a linear acid anhydride formed from at least one aliphatic polybasic carboxylic acid selected from the group consisting of adipic acid, pimelic acid, suberic acid, azelaic acid, sebacic acid, undecanedicarboxylic acid, dodecandioic acid, eicosanedicarboxylic acid and octadecanedicarboxylic acid.

10. The thermosetting (meth)acrylic powder paint according to claim 1, wherein the total amount of the carboxyl group and/or acid anhydride group in the polybasic carboxylic compound (B) molecule is 0.5 to 1.3 equivalents for each equivalent of the glycidyl group in the copolymer (A).

11. The thermosetting (meth)acrylic powder paint according to claim 1, which further comprises a monomer having at least one carboxyl group, as a polymerizable monomer for constituting the shell of the particle (C) having a core/shell structure in which the core is covered at least partially with at least one shell.

12. The thermosetting (meth)acrylic powder paint according to claim 1, wherein the particle (C) has a core/shell structure in which the core is covered at least partially with at least one shell and has an average diameter of 0.01 to 5 μm.

13. The thermosetting (meth)acrylic powder paint according to claim 1, wherein the particles (C) having a core/shell structure in which the core is covered at least partially with at least one shell are used in an amount of 2 to 50 parts by weight per 100 parts by weight of the total weight of the acrylic and/or methacrylic copolymer (A) and the polybasic carboxylic compound (B).

14. A process for preparing the thermosetting (meth) acrylic powder paint of claim 1, which comprises mechanically-kneading uniformly a mixture comprising the acrylic and/or methacrylic copolymer (A), the polybasic carboxylic compound (B) and the particles (C) having a core/shell structure in which the core is covered at least partially with at least one shell, wherein the temperature of the mixture is regulated to a higher temperature than the lower temperature of either (i) a temperature lower by 30° C. than the glass transition point of the acrylic and/or methacrylic copolymer (A) or (ii) the melting temperature of the polybasic carboxylic compound (B).

15. The thermosetting (meth)acrylic powder paint according to claim 1, wherein the synthetic rubber is selected from the group consisting of polybutadiene, polyisoprene, polyacrylate rubber, polyvinyl chloride, styrene-butadiene copolymer, styrene-butadiene-styrene block copolymer, styrene-isoprene-styrene copolymer and styrene-ethylene/butylene-styrene copolymer.

16. The thermosetting (meth)acrylic powder paint according to claim 1, wherein the particle (C) having a core/shell structure is present as a dispersed phase in a cured paint film formed from the thermosetting powder paint, and the particle (C) improves the impact resistance and chipping resistance of the paint film.

* * * * *